United States Patent
Yang et al.

(10) Patent No.: US 10,523,290 B2
(45) Date of Patent: Dec. 31, 2019

(54) CODEBOOK-BASED UPLINK TRANSMISSION IN WIRELESS COMMUNICATIONS

(71) Applicant: MediaTek Inc., Hsinchu (TW)

(72) Inventors: Weidong Yang, San Diego, CA (US); Lung-Sheng Tsai, Hsinchu (TW); Bo-Si Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/129,774

(22) Filed: Sep. 12, 2018

(65) Prior Publication Data

US 2019/0081668 A1    Mar. 14, 2019

Related U.S. Application Data

(60) Provisional application No. 62/557,194, filed on Sep. 12, 2017, provisional application No. 62/560,231, filed on Sep. 19, 2017.

(51) Int. Cl.
*H04B 7/0456* (2017.01)
*H04B 7/0404* (2017.01)
*H04B 7/04* (2017.01)

(52) U.S. Cl.
CPC ............ *H04B 7/0456* (2013.01); *H04B 7/04* (2013.01); *H04B 7/0404* (2013.01); *H04B 7/0486* (2013.01)

(58) Field of Classification Search
CPC ...... H04B 7/0456; H04B 7/04; H04B 7/0404; H04B 7/0486
See application file for complete search history.

(56) References Cited

U.S. PATENT DOCUMENTS

| | | | |
|---|---|---|---|
| 2009/0274230 A1* | 11/2009 | Heath, Jr. | ............ H04B 7/0634 375/260 |
| 2012/0063494 A1* | 3/2012 | Frenne | ................ H04B 7/0417 375/219 |
| 2015/0063485 A1 | 3/2015 | Lee et al. | |
| 2016/0323029 A1 | 11/2016 | Cheng et al. | |

FOREIGN PATENT DOCUMENTS

| | | |
|---|---|---|
| CN | 101674642 A | 3/2010 |
| CN | 101682453 A | 3/2010 |
| WO | WO 2010093140 A2 | 8/2010 |

OTHER PUBLICATIONS

State Intellectual Property Office of China, International Search Report and Written Opinion for International Patent Application No. PCT/CN2018/105318, dated Dec. 5, 2018.

* cited by examiner

*Primary Examiner* — Vineeta S Panwalkar
(74) *Attorney, Agent, or Firm* — Han IP PLLC; Andy M. Han

(57) ABSTRACT

Various solutions with respect to codebook-based uplink transmission in wireless communications are described. A user equipment (UE) constructs a precoder to be used to wirelessly communicate with a network node of a wireless network. The UE then performs an uplink (UL) transmission to the network node using the precoder via one or more of a plurality of antennas of the UE.

16 Claims, 5 Drawing Sheets

| Port combination | | | Rank 1 | # of CWs Rank 1 | Rank 2 | # of CWs Rank 2 | Rank 3 | # of CWs Rank 3 | Rank 4 | # of CWs Rank 4 |
|---|---|---|---|---|---|---|---|---|---|---|
| | Non-ULA based (A) | Rel-8 DL 4Tx (A.1) | | | Householder extension from Rank 1 (slightly better than Rel-8 4Tx) | 16 | Householder extension from Rank 1 | 16 | Householder extension from rank 1 (# of CWs is reduced) | 16 |
| | | Rel-10 UL Tx (A.2) | X (port combining codewords of A.2); CWs 0-15 | 16 | | | | | | |
| | ULA based (B) | Rel-12 DL 4Tx (B.1) | | | | | | | | |
| | | NR DL 4Tx (B.2) | X (N1=2, O1=4, L=1)->2x4x4(cophasing) | 32 | X (N1=2, O1=4, L=1)->2x4x2(two K's)x2(cophasing) | 32 | X (N1=2, O1=4, L=1)->2x4x2(cophasing) | 32 | X (N1=2, O1=4, L=1)->2x4x2(cophasing) | 16 |
| | Port combining/selection according to coherence groups (C) | | {(1,2)},{(3,4)}, {(1)},...,{(4)} | 12 | {(1,2),(3,4)},{(1,2)}, {(3,4)},{(1),(3)},{(1,2),(4)}, {(2,3)},{(2),(4)} | 42 | {(1,2),(3)},{(1,2),(4)}, {(1),(3,4)},{(2),(3,4)} | 42 | {(1,2),(3,4)}, or {(1),(2),(3),(4)} | 36 |
| | Port selection (D) | | {(1)},...,{(4)} (already accounted for in the | | | | | | | |
| | PAPR preserving (E) | | some codewords in Rel 10 UL codebook | 8 | some codewords in Rel 10 UL codebook | 8 | some codewords in Rel 10 UL codebook | 8 | some codewords in Rel 10 UL codebook | 8 |
| | Total | | | 68 | | 98 | | 98 | | 76 |

FIG. 5

CODEBOOK-BASED UPLINK TRANSMISSION IN WIRELESS COMMUNICATIONS

CROSS REFERENCE TO RELATED PATENT APPLICATION(S)

The present disclosure is part of a non-provisional application claiming the priority benefit of U.S. Patent Application Nos. 62/557,194 and 62/560,231, filed on 12 Sep. 2017 and 19 Sep. 2017, respectively, the contents of which are incorporated by reference in their entirety.

TECHNICAL FIELD

The present disclosure is generally related to wireless communications and, more particularly, to codebook-based uplink transmission in wireless communications.

BACKGROUND

Unless otherwise indicated herein, approaches described in this section are not prior art to the claims listed below and are not admitted as prior art by inclusion in this section.

In Long-Term Evolution (LTE) and New Radio (NR) mobile communications, a dual-stage codebook design has been in use since Rel-10 of the specification, even though many important details have been continuously included in more recent releases.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of solutions, schemes, methods and apparatus pertaining to codebook-based transmission in wireless communications. It is believed that the proposed solutions, schemes, methods and apparatus may reduce signaling overhead as well as enhance robustness in transmission by the UE under a variety of antenna configuration, thereby improving system performance.

In one aspect, a method may involve a processor of a user equipment (UE) constructing a precoder to be used to wirelessly communicate with a network node of a wireless network. The method may further involve the processor performing an uplink (UL) transmission to the network node using the precoder via one or more of a plurality of antennas of the UE.

In one aspect, an apparatus may include a transceiver and a processor coupled to the transceiver. The transceiver may include a plurality of antennas and may be capable of wirelessly communicating with a network node of a wireless network. The processor may be capable of: (a) constructing a precoder to be used to wirelessly communicate with the network node; and (b) performing, via the transceiver, an UL transmission to the network node using the precoder via one or more of the plurality of antennas.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 shows example component codebooks in an example master codebook in accordance with an implementation of the present disclosure.

DETAILED DESCRIPTION OF PREFERRED IMPLEMENTATIONS

Figure 1:
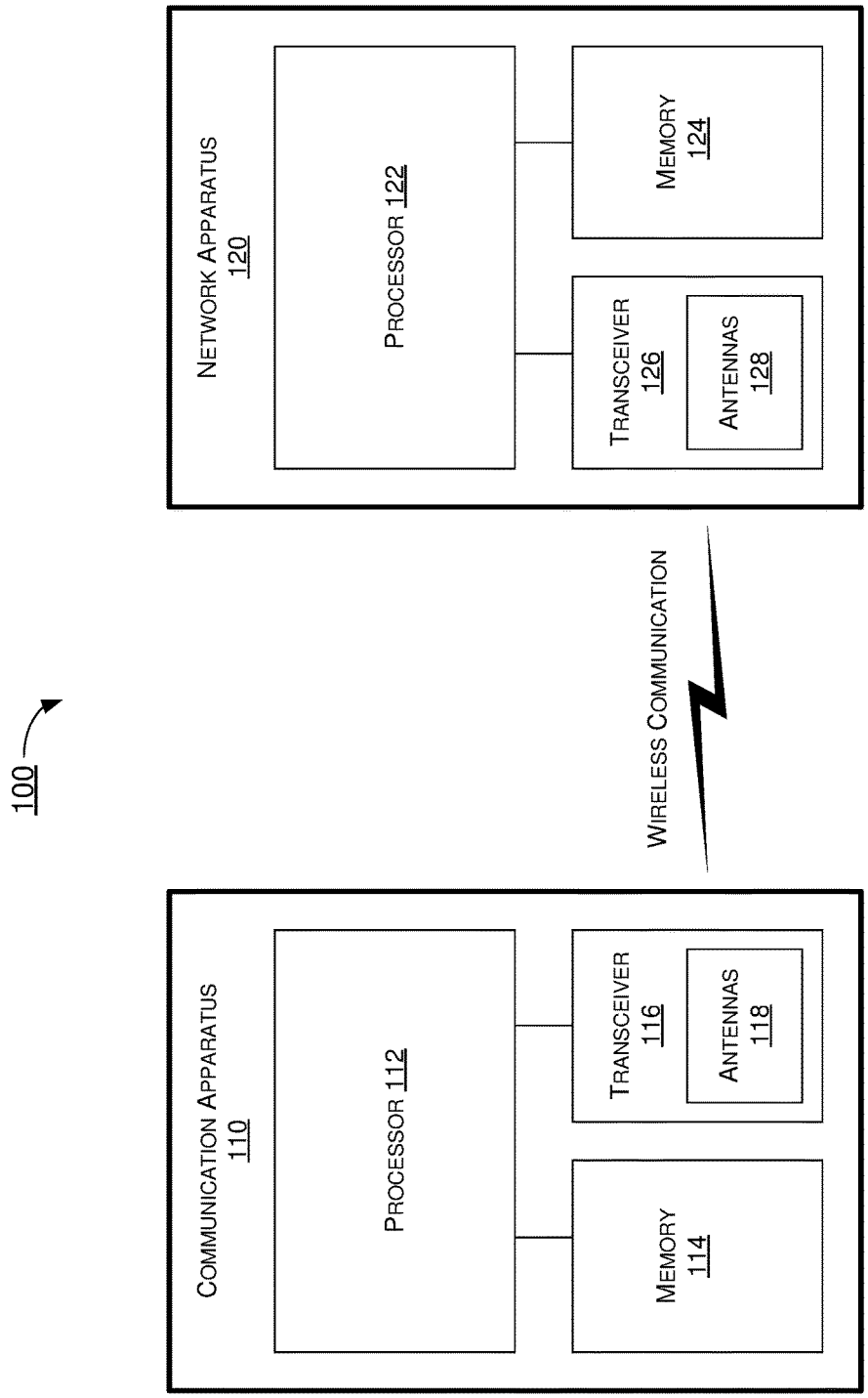
FIG. 1 is a diagram of an example wireless communication environment in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to codebook-based uplink transmission in wireless communications. According to the present disclosure, a number of possible solutions may be implemented separately or jointly. That is, although these possible solutions may be described below separately, two or more of these possible solutions may be implemented in one combination or another.

Motivated by the uniform linear array (ULA) antenna configurations often encountered at the network side at a base station (e.g., gNB), a dual-stage codebook in LTE/NR is typically formulated as follows:

$$W_{1,i_{11},i_{12}}W_2,$$

Here, $W_{1,i_{11}i_{12}}$ includes discrete FOURIER transformation (DFT) beams, and $W_2$ performs beam selection and co-phasing. Moreover, $i_{11}$ and $i_{12}$ denote beam group indices for the vertical and horizontal dimensions (with $(i_{11},i_{12})$ completely specifying the beam groups for $W_{1,i_{11},i_{12}}$).

Non-Uniform Linear Array Motivated Codebook Design

Under a proposed scheme in accordance with the present disclosure, Rel-8 downlink (DL) four-transmitter (4Tx) codebook and Rel-10 uplink (UL) 4Tx codebook may be considered for non-ULA antenna configurations and rich scatter environments. In the Rel-8 DL 4Tx codebook, a column vector $u_n$ is used to construct a unitary matrix through the Householder transformation:

$W_n = I - 2u_n u_n^H/u_n^H u_n$, or $W_n = I - 2u_n u_n^H$ for matrix $u_n$ with orthonormal column vectors.

Moreover, precoders at different ranks/transport blocks are obtained through column selection of the unitary matrix $W_n$.

Rel-10 UL 4Tx codebook uses mutually unbiased bases (MUBs) to construct rank 1 codewords, and different design principles and considerations were used to construct codewords for rank 2, rank 3 and rank 4. Under a proposed scheme in accordance with the present disclosure, rank 1 codewords according to Rel-10 UL 4Tx codebook can be used through the Householder transformation to construct rank 1, rank 2, rank 3 and rank 4 codewords.

Under the proposed scheme, development of a codebook for a 4Tx antenna configuration may start with five MUBs at dimension 4 as follows:

$$M_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}$$

From MUB k, one vector $q_k$ may be chosen to construct a 4×4 precoder. For example, from $M_1$, the third vector may be chosen and may be denoted as follows:

$$q_1 = \frac{1}{2}(1,-1,-1,1)^T.$$

Under the proposed scheme, Householder transformation may be applied on $q_k$ to obtain the 4×4 precoder as follows:

$$W^{(k)} = I_{4\times 4} - 2q_k q_k^H/q_k^H q_k,$$

Let $e_i$ be the 4×1 vector with zeros at all elements except element i, with the value at element i being 1. Then, four rank 1 precoders may be generated for MUB k as follows:

$$W^{(k)}e_i, i=1,2,3,4.$$

Additionally, six rank 2 precoders may be generated for MUB k as follows:

$$W^{(k)}[e_i e_j], i,j=1,2,3,4, i\neq j.$$

Under the proposed scheme, to minimize, reduce or otherwise control the signaling overhead, four out of the six precoders in the codebook may be chosen according to a chordal distance metric (e.g., choosing precoders with a chordal distance less than a predefined value). For example, the following chordal distance metric may be chosen: $(i,j)=(1,2),(2,3),(3,4),(4,1)$. Accordingly, a chord distance profile for all rank 2 precoders constructed thereby from $M_1$, $\Lambda$, $M_4$ may compare favorably with (e.g., shorter than) that for the rank 2 precoders from Rel-8 DL 4Tx codebook.

Under the proposed scheme, four rank 3 precoders may be generated for MUB k as follows:

$$W^{(k)}[e_i e_j e_l], (i,j,l)=(1,2,3),(1,2,4),(1,3,4),(2,3,4).$$

Assuming all four spatial layers are mapped to one transport block, one rank 4 precoder may be generated for MUB k as follows:

$$W^{(k)}[e_1 e_2 e_3 e_4].$$

In an event that four spatial layers can be mapped to two transport blocks or NR codeword mapping can be further optimized in the future, then under the proposed scheme layer permutation as in Rel-8 4Tx codebook may also be considered.

In an event that $M_0$ is also included along with $M_1$ to $M_4$, then under the proposed scheme port selection precoders may also be included in the resulted codebook.

In an event that a dual-stage codebook is preferred (e.g., to achieve some commonality with the ULA-motivated component codebook as discussed below), then under the proposed scheme $W^{(k)}$ may take the role of $W_1$ and, additionally, $[e_i \Lambda e_j]$ may take the role of $W_2$.

There may be some benefit in aligning the NR 4Tx UL codebook with the LTE 4Tx UL codebook, at least for the common part. Specifically, the following may be verified: (a) $W^{(1)}e_i$, i=1,2,3,4 generate precoders 0,2,8,10 at rank 1 from Rel-10 4Tx UL codebook; (b) $W^{(2)}e_i$, i=1,2,3,4 generate precoders 1,3,9,11, at rank 1 from Rel-10 4Tx UL codebook; (c) $W^{(3)}e_i$, i=1,2,3,4 generate precoders 5,7,13,15 at rank 1 from Rel-10 4Tx UL codebook; and (d) $W^{(4)}e_i$, i=1,2,3,4 generate precoders 4,6,12,14 at rank 1 from Rel-10 4Tx UL codebook. Accordingly, the considered codebook design for ranks 1~4 may be considered as an extension from rank 1 precoders 0~15 of the Rel-10 4Tx UL codebook.

In an event that additional orthogonal bases besides the above four or five MUBs are used in codebook construction, then under the proposed scheme a larger codebook may be obtained. Enforcing a constraint of using the alphabet $\{1,-1, j,-j\}$ and nothing else to construct vectors, there may be a total of sixty orthogonal bases over the four-dimension space. All the sixty orthogonal bases may be generated as described below.

Under the proposed scheme, firstly, four orthogonal bases (with each column thereof being for a respective vector) may be defined as follows:

$$P_1 = \begin{bmatrix} 1 & 1 & 1 & 1 \\ 1 & -1 & -1 & 1 \\ 1 & -1 & 1 & -1 \\ 1 & 1 & -1 & -1 \end{bmatrix}, P_2 = \begin{bmatrix} 1 & 1 & 1 & 1 \\ 1 & -1 & -j & j \\ 1 & -1 & j & -j \\ 1 & 1 & -1 & -1 \end{bmatrix},$$

$$P_3 = \begin{bmatrix} 1 & 1 & 1 & 1 \\ 1 & -1 & -j & j \\ 1 & 1 & -1 & -1 \\ 1 & -1 & j & -j \end{bmatrix}, P_4 = \begin{bmatrix} 1 & 1 & 1 & 1 \\ 1 & 1 & -1 & -1 \\ 1 & -1 & -j & j \\ 1 & -1 & j & -j \end{bmatrix}.$$

Then, each orthogonal basis with alphabet $\{1,-1,j,-j\}$ may be represented by a collection of column vectors as follows:

$$v_k = [v_{k,1} v_{k,2} v_{k,3} v_{k,4}], \text{ for } k=1,\Lambda,60.$$

It can be verified that all the column vectors $v_k$, $1 \leq k \leq 60$, may be obtained through the following:

$$v_k = \begin{bmatrix} r_{k,1} & & & \\ & r_{k,2} & & \\ & & r_{k,3} & \\ & & & r_{k,4} \end{bmatrix} p_{m_k}, \text{ with}$$

$r_{k,1}, \Lambda, r_{k,4} \in \{1, -1, j, -j\}$, and $1 \leq m_k \leq 4$.

Specifically, the four MUBs used previously may be expressed as follows:

$$M_1 = \begin{bmatrix} 1 & & & \\ & 1 & & \\ & & 1 & \\ & & & 1 \end{bmatrix} P_1, M_2 = \begin{bmatrix} 1 & & & \\ & 1 & & \\ & & -j & \\ & & & j \end{bmatrix} P_1,$$

$$M_3 = \begin{bmatrix} 1 & & & \\ & -j & & \\ & & -j & \\ & & & -1 \end{bmatrix} P_1, M_4 = \begin{bmatrix} 1 & & & \\ & -j & & \\ & & 1 & \\ & & & j \end{bmatrix} P_1.$$

Similar phase rotations may be applied to $P_1, \ldots, P_4$, for example, as follows:

$$M_5 = \begin{bmatrix} 1 & & & \\ & 1 & & \\ & & 1 & \\ & & & 1 \end{bmatrix} P_2, M_6 = \begin{bmatrix} 1 & & & \\ & 1 & & \\ & & -j & \\ & & & j \end{bmatrix} P_2,$$

$$M_7 = \begin{bmatrix} 1 & & & \\ & -j & & \\ & & -j & \\ & & & -1 \end{bmatrix} P_2, M_8 = \begin{bmatrix} 1 & & & \\ & -j & & \\ & & 1 & \\ & & & j \end{bmatrix} P_2.$$

Then, $M_1, \ldots, M_8$ may be used in the codebook construction.

Orthogonal Bases with 8PSK Alphabet

Under a proposed scheme in accordance with the present disclosure, with an eight phase shift keying (8PSK) alphabet, a phase representation (in degrees) may be used for basis vectors. For matrices below, each column may be for one basis vector. Ten orthogonal bases may be expressed as follows, with $B_1$ being the phase representation in degrees of the Hadamard matrix $$\begin{bmatrix} 1 & 1 & 1 & 1 \\ 1 & -1 & -1 & 1 \\ 1 & -1 & 1 & -1 \\ 1 & 1 & -1 & -1 \end{bmatrix} : B_1 = \begin{bmatrix} 0 & 0 & 0 & 0 \\ 0 & 180 & 180 & 0 \\ 0 & 180 & 0 & 180 \\ 0 & 0 & 180 & 180 \end{bmatrix}.$$

Other matrices (with unit amplitude for all elements) also in phase representations are as follows:

$$B_2 = \begin{bmatrix} 0 & 0 & 0 & 0 \\ 0 & 180 & 225 & 45 \\ 0 & 180 & 45 & 225 \\ 0 & 0 & 180 & 180 \end{bmatrix}$$

$$B_3 = \begin{bmatrix} 0 & 0 & 0 & 0 \\ 0 & 180 & 270 & 90 \\ 0 & 180 & 90 & 270 \\ 0 & 0 & 180 & 180 \end{bmatrix}$$

$$B_4 = \begin{bmatrix} 0 & 0 & 0 & 0 \\ 0 & 180 & 315 & 135 \\ 0 & 180 & 135 & 315 \\ 0 & 0 & 180 & 180 \end{bmatrix}$$

It is noteworthy that $B_2$ to $B_4$ may be obtained by replacing the submatrix at columns 3 and 4 and rows 2 and 3 in $B_1$ with another 2×2 matrix T(s) as follows:

$$\begin{bmatrix} 180 & 0 \\ 0 & 180 \end{bmatrix} + s, s = 45, 90, 135.$$

Similarly, by replacing the submatrix at columns 1 and 3 and rows 1 and 3 in $B_1$ with T(s), the following three orthogonal bases may be obtained:

$$B_5 = \begin{bmatrix} 0 & 0 & 0 & 0 \\ 0 & 225 & 180 & 45 \\ 0 & 180 & 0 & 180 \\ 0 & 45 & 180 & 225 \end{bmatrix}$$

$$B_6 = \begin{bmatrix} 0 & 0 & 0 & 0 \\ 0 & 270 & 180 & 90 \\ 0 & 180 & 0 & 180 \\ 0 & 90 & 180 & 270 \end{bmatrix}$$

$$B_7 = \begin{bmatrix} 0 & 0 & 0 & 0 \\ 0 & 315 & 180 & 135 \\ 0 & 180 & 0 & 180 \\ 0 & 135 & 180 & 315 \end{bmatrix}$$

Replacing the submatrix at columns 2 and 4 and rows 3 and 4 in $B_1$ with T(s), the following three orthogonal bases may be obtained:

$$B_8 = \begin{bmatrix} 0 & 0 & 0 & 0 \\ 0 & 180 & 0 & 180 \\ 0 & 225 & 180 & 45 \\ 0 & 45 & 180 & 225 \end{bmatrix}$$

$$B_9 = \begin{bmatrix} 0 & 0 & 0 & 0 \\ 0 & 180 & 0 & 180 \\ 0 & 270 & 180 & 90 \\ 0 & 90 & 180 & 270 \end{bmatrix}$$

$$B_{10} = \begin{bmatrix} 0 & 0 & 0 & 0 \\ 0 & 180 & 0 & 180 \\ 0 & 315 & 180 & 135 \\ 0 & 135 & 180 & 315 \end{bmatrix}$$

Then, all the orthogonal bases with the 8PSK alphabet over the four-dimension space may be given by $V_k$, $1 \le k$, which may be obtained as follows:

$$v_k = \begin{bmatrix} r_{k,1} & & & \\ & r_{k,2} & & \\ & & r_{k,3} & \\ & & & r_{k,4} \end{bmatrix} B_{m_k},$$

Here, $r_{k,1}, \Lambda, r_{k,4}$ may take values from the 8PSK alphabet, $1 \le m_k \le 10$.

In view of the above, under the proposed scheme, Householder transformation may be applied on Rel-10 MUBs and additional orthogonal bases to generate codewords for non-ULA scenarios.

Uniform Linear Array Motivated Codebook Design

In Rel-12, a 4Tx codebook for DL with the dual-codebook structure was specified for rank 1 and rank 2 transmissions. For rank 3 and rank 4 transmissions, the Rel-8 4Tx codebook has been inherited and reused. In NR, a 4Tx codebook for DL, also with the dual-codebook structure, has been agreed. These codebooks may be considered as candidates for inclusion in a master codebook such as the master codebook described herein and shown in FIG. 5.

Under a proposed scheme in accordance with the present disclosure, Householder transformation may be applied on rank 1 precoders from a given 4Tx codebook to generate higher-rank precoders (e.g., rank 2, rank 3 and/or rank 4 precoders). Under the proposed scheme, such higher-rank precoders may be used independently or jointly with one or more pre-existing higher-rank precoders from the 4Tx codebook. In an event that the higher-rank precoders thus generated are used jointly with existing higher-rank precoders from the 4Tx codebook, two different codebook construction methods may be used for precoders at a given rank. The two methods may include, for example and without limitation, a grids-of-beam based method and a Householder-based method. Under the proposed scheme, the 4Tx codebook may be the Rel-14 LTE 4Tx codebook or Rel-15 NR DL 4Tx codebook, which may provide a way to systematically enumerate many 4Tx vectors.

For illustrative purposes and without limitation, assuming that $v_n$ is a rank 1 precoder from either the Rel-14 LTE 4Tx codebook or Rel-15 NR DL 4Tx codebook, then initially in a process under the proposed scheme the sign of the first element in $v_n$ may be flipped or otherwise negated to obtain a vector $q_n$ expressed as follows:

$$q_n = \begin{bmatrix} -1 & & & \\ & 1 & & \\ & & 1 & \\ & & & 1 \end{bmatrix} v_n.$$

Next, under the proposed scheme, Householder transformation may be applied on $q_n$ as follows:

$$\tilde{W}_n = I - 2 q_n q_n^H / q_n^H q_n,$$

It can be verified that the first column of $\tilde{W}_n$ is identical to $v_n$. For higher ranks, column selection may be performed (e.g., $\{1,2\},\{1,3\}$, and so on for rank 2).

Design of Master Codebook

To account for the diverse situations and also forward compatibility, the UL codebook(s) should support different UEs presently and in the future for phase-coherence transmissions and partially phase-coherence transmissions. It is also desirable that cyclic-prefix orthogonal frequency-division multiplexing (CP-OFDM) waveforms and discrete Fourier transformation OFDM (DFT-OFDM) waveforms are supported for UL transmissions with the same codebook.

In view of the above, a master codebook with all the above taken into consideration may contain a large number of codewords at least for some ranks, and particularly useful codewords for a specific UE with a specific waveforms (e.g., DFT-OFDM) and a specific Tx architecture may be more limited. The CBSR may be signaled by a base station/network node to a UE either in the form of a bitmap for codewords in the master codebook or in the form of pointer(s) to sub-codebooks within the master codebook. In case that two UL waveforms can be dynamically switched with a UL DCI, besides introducing a field for waveform switching or tying a used waveform to a code state in some other field (e.g., low modulation coding scheme (MCS) indices being associated with DFT-OFDM and high MCS indices being associated with CP-OFDM), separate CBSRs for two waveforms may also be configured for the UE.

For DL transmissions, conventionally CBSR does not lead to change in the signaling design (e.g., in transmission mode 4 (TM4) in LTE). With demodulation reference signal (DMRS)-based transmission from a base station, it also becomes unnecessary for the base station to signal the used precoder to a UE.

In NR, for codebook-based UL multiple-input-and-multiple-output (MIMO), as DCI bits in an UL DCI format come at a premium especially for cell edge UEs, it is desirable to reflect the CBSR in the signaling design. In other words, even though the master codebook may be designed to cover phase-coherent transmissions/non-phase-coherent transmissions/partially phase-coherent transmissions as well as waveforms such as CP-OFDM and DFT-OFDM, a codebook currently in use can be a subset of the master codebook (e.g., depending on the used waveform and UE Tx chain capability (coherent transmissions vs non-coherent transmissions vs partial coherent transmissions)). The transmitted precoding matrix indicator (TPMI) field in the DCI for UL grant is budgeted according to the sub-codebook resulted from CBSR, from which a more compact DCI can be used compared with the case of using TPMI to address all possible codewords in the master codebook.

With respect to phase-coherent transmissions/non-phase-coherent transmissions/partially phase-coherent transmissions, Tx chains at a UE may be categorized into different coherence groups. Tx chains within a coherence group do not suffer from issues such as RPD or non-common mode phase noise. Thus, port combining is possible over Tx chains within a given coherence group.

Under a proposed scheme in accordance with the present disclosure, four Tx chains at a UE may be denoted by 1, 2, 3 and 4. In an event that Tx chains 1 and 3 are in one coherence group and Tx chains 2 and 4 are in another coherence group, then the notion of (1,3), (2,4) may be used to represent such particular Tx chain configuration. In an event that all Tx chains are in the same coherence group, then that configuration may be represented by (1,2,3,4). In an event that no two chains can perform phase-coherent transmissions, then the notion of (1),(2),(3),(4) may be used.

Under the proposed scheme, for a 4Tx codebook, the following may be supported: (a) four antennas on a single coherence group, denoted by: (1, 2, 3, 4), (b) one pair of Tx chains in coherence group 1 and another pair of TX chains in coherence group 2, denoted by: (1, 2), (3, 4), (1, 3), (2, 4) or (1, 4), (2, 3), (c) four Tx chains in four coherence groups (e.g., no Tx chain is coherent with any other Tx chain), denoted by: (1), (2), (3), (4).

Having the flexibility to use arbitrary SRS port indexing irrespective of coherence groups does not provide value to either the base station or the UE. Hence, under a proposed scheme in accordance with the present disclosure, all the SRS ports mapped to Tx chains in the same coherence group may be processed using consecutive indices. Accordingly, a UE may signal to the network of coherence group composition to indicate how many coherence groups are present at the UE. In the case of two coherence groups at a UE, it may be the coherence group composition (1,2),(3,4) that is considered, not (1,3),(2,4), for example.

Under the proposed scheme, for Tx chains in the same coherence group, port combining may be possible. Port selection among coherence groups may be supported. For instance, with Tx chain composition (1,2), (3,4), using port combining from coherence groups 1 and 2 as well as from coherence groups from 3 and 4 may support rank 2 transmission. Moreover, port selection with coherence groups 1 and 3 may also support rank 2 transmission. It is noteworthy that, although 4Tx design considerations may be used as an example and described herein, the proposed scheme and design may also be applied to 8Tx or more Tx chains.

FIG. 5 shows example component codebooks in an example master codebook 500 in accordance with an implementation of the present disclosure. Referring to FIG. 5, example master codebook 500 for 4Tx UE may include a number of components. For instance, the following components are included: (a) port combining for 4Tx for non-ULA-based codebook, A.1 and A.2, with it being necessary to include either A.1 or A.2; (b) port combining for 4Tx for ULA-based codebook, B.1 and B.2, with it being necessary to include either B.1 or B.2 to be included (e.g., two candidates for consideration may include Rel-12 DL 4Tx codebook and NR DL 4Tx codebook); (c) recursive construction from NR 2Tx codebook, C; (d) port selection for AGI, D, with C being completely covered by C; and (e) PAPR preserving codewords, E. In other words, master codebook 500 for 4Tx UL transmissions may include component codebook entries tailored for diverse antenna configurations, coherence group compositions and sensitivities to PAPR.

Under the proposed scheme, the base station may configure different components according to the need of the UE. For example, for a UE that does not suffer from the RPD issue, A.1 (or A.2), B.1 (or B.2) and D may be configured for CP-OFDM waveforms. As another example, for a UE that does not suffer from the RPD issue, D and E may be configured for DFT-OFDM waveforms. As yet another example, for a UE that suffers from the RPD issue, C and D may be configured for CP-OFDM waveforms.

Illustrative Implementations

FIG. 1 illustrates an example wireless communication environment 100 in accordance with an implementation of the present disclosure. Wireless communication environment 100 may involve a communication apparatus 110 and a network apparatus 120 in wireless communication with each other. Each of communication apparatus 110 and network apparatus 120 may perform various functions to implement procedures, schemes, techniques, processes and methods described herein pertaining to codebook-based uplink transmission in wireless communications, including the various procedures, scenarios, schemes, solutions, concepts and techniques described above as well as processes 200, 300 and 400 described below.

Communication apparatus 110 may be a part of an electronic apparatus, which may be a UE such as a portable or mobile apparatus, a wearable apparatus, a wireless communication apparatus or a computing apparatus. For instance, communication apparatus 110 may be implemented in a smartphone, a smartwatch, a personal digital assistant, a digital camera, or a computing equipment such as a tablet computer, a laptop computer or a notebook computer. Moreover, communication apparatus 110 may also be a part of a machine type apparatus, which may be an IoT or NB-IoT apparatus such as an immobile or a stationary apparatus, a home apparatus, a wire communication apparatus or a computing apparatus. For instance, communication apparatus 110 may be implemented in a smart thermostat, a smart fridge, a smart door lock, a wireless speaker or a home control center. Alternatively, communication apparatus 110 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Communication apparatus 110 may include at least some of those components shown in FIG. 1 such as a processor 112, for example. Communication apparatus 110 may further include one or more other components not pertinent to the proposed scheme of the present disclosure (e.g., internal power supply, display device and/or user interface device), and, thus, such component(s) of communication apparatus 110 are neither shown in FIG. 1 nor described below in the interest of simplicity and brevity.

Network apparatus 120 may be a part of an electronic apparatus, which may be a network node such as a TRP, a base station, a small cell, a router or a gateway. For instance, network apparatus 120 may be implemented in an eNodeB in an LTE, LTE-Advanced or LTE-Advanced Pro network or in a gNB in a 5G, NR, IoT or NB-IoT network. Alternatively, network apparatus 120 may be implemented in the form of one or more IC chips such as, for example and without limitation, one or more single-core processors, one or more multi-core processors, one or more RISC processors, or one or more CISC processors.

Network apparatus 120 may include at least some of those components shown in FIG. 1 such as a processor 122, for example. Network apparatus 120 may further include one or more other components not pertinent to the proposed scheme of the present disclosure (e.g., internal power supply, display device and/or user interface device), and, thus, such component(s) of network apparatus 120 are neither shown in FIG. 1 nor described below in the interest of simplicity and brevity.

In one aspect, each of processor 112 and processor 122 may be implemented in the form of one or more single-core processors, one or more multi-core processors, one or more RISC processors, or one or more CISC processors. That is, even though a singular term "a processor" is used herein to refer to processor 112 and processor 122, each of processor 112 and processor 122 may include multiple processors in some implementations and a single processor in other implementations in accordance with the present disclosure. In another aspect, each of processor 112 and processor 122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 112 and processor 122 is a special-purpose machine specifically designed, arranged and configured to perform specific tasks pertaining to codebook-based uplink transmission in wireless communications in accordance with various implementations of the present disclosure.

In some implementations, communication apparatus 110 may also include a transceiver 116 coupled to processor 112 and capable of wirelessly transmitting and receiving data, signals and information. Transceiver 116 may include a plurality of antennas 118 including a plurality of transmit antennas (e.g., four transmit antennas) as well as a plurality of receive antennas (e.g., four receive antennas). In some implementations, communication apparatus 110 may further include a memory 114 coupled to processor 112 and capable of being accessed by processor 112 and storing data therein. In some implementations, network apparatus 120 may also include a transceiver 126 coupled to processor 122 and capable of wirelessly transmitting and receiving data, signals and information. Transceiver 126 may include a plurality of antennas 128 including a plurality of transmit antennas (e.g., four transmit antennas) as well as a plurality of receive antennas (e.g., four receive antennas). In some implementations, network apparatus 120 may further include a memory 124 coupled to processor 122 and capable of being accessed by processor 122 and storing data therein. Accordingly, communication apparatus 110 and network apparatus 120 may wirelessly communicate with each other via transceiver 116 and transceiver 126, respectively.

To aid better understanding, the following description of the operations, functionalities and capabilities of each of communication apparatus 110 and network apparatus 120 is provided in the context of a mobile communication environment in which communication apparatus 110 is implemented in or as a communication apparatus or a UE and network apparatus 120 is implemented in or as a network node (e.g., gNB or TRP) of a wireless network (e.g., 5G/NR mobile network).

Under various schemes in accordance with the present disclosure, processor 112 of communication apparatus 110 may construct a precoder be used to wirelessly communication with network apparatus 120. Moreover, processor 112 may perform, via transceiver 116, an UL) transmission to the network node using the precoder via one or more of the plurality of antennas 118. Additionally, or alternatively, processor 112 may determine an antenna configuration (e.g., ULA or non-ULA antenna configuration) to be used to wirelessly communicate with network apparatus 120 via the plurality of antennas 118 of transceiver 116. Processor 112 may also construct a precoder or codebook corresponding to the antenna configuration. Processor 112 may further perform, via transceiver 116, an UL transmission to network apparatus 120 using the precoder via one or more of the plurality of antennas 118 in the antenna configuration.

In some implementations, in constructing the precoder, processor 112 may be capable of: (a) applying a phase rotation to a first vector in a mutually unbiased basis (MUB) of a plurality of MUBs to generate a second vector; (b) applying a Householder transformation on the second vector to generate an orthonormal basis; and (c) performing column selection on the orthonormal basis to obtain the precoder.

In some implementations, the phase rotation may include a zero-degree rotation for all elements in the first vector.

In some implementations, in performing the column selection, processor 112 may be capable of selecting one of a plurality of columns in the orthonormal basis for the precoder having a chordal distance smaller than a predefined value with other constructed or chosen precoders following the procedure. In some implementations, the chordal distance comprises a distance between the precoder and each of one or more other precoders from one or more other MUBs of the plurality of MUBs in a respective phase rotation.

In some implementations, the precoder may include one or more port selection precoders. In some implementations, the plurality of MUBs may include the following:

$$M_0 == \begin{bmatrix} 1 & 0 & 0 & 0 \\ 0 & 1 & 0 & 0 \\ 0 & 0 & 1 & 0 \\ 0 & 0 & 0 & 1 \end{bmatrix}, M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}$$

In some implementations, in constructing the precoder, processor 112 may be capable of performing a precoder construction procedure that includes: (a) constructing a dual-stage codebook with discrete Fourier transformation (DFT) beams; (b) selecting a vector or matrix from the dual-stage codebook; (c) applying a Householder transformation on the vector or matrix to generate an orthonormal basis; and (d) performing column selection on the orthonormal basis to obtain the precoder.

In some implementations, the vector or matrix selected from the dual-stage codebook may include a rank 1 precoder.

In some implementations, in applying the Householder transformation, processor 112 may be capable of negating a sign of a first element in the rank 1 precoder while retaining a sign of each of other elements in the rank 1 precoder.

In some implementations, the precoder may include a rank 2, rank 3 or rank 4 precoder. In some implementations, in performing the UL transmission to the network node using the precoder, processor 112 may be capable of performing the UL transmission to the network node using either a) the rank 2, rank 3 or rank 4 precoder constructed from the Householder transformation solely. Alternatively, processor 112 may be capable of constructing the rank 2, rank 3 or rank 4 precoder from the precoder construction procedure described above (involving Householder transformation) or one or more pre-existing rank 2, rank 3 or rank 4 precoders and performing the UL transmission using the rank 2, rank 3 or rank 4 precoder thus constructed.

Illustrative Processes

Figure 2:
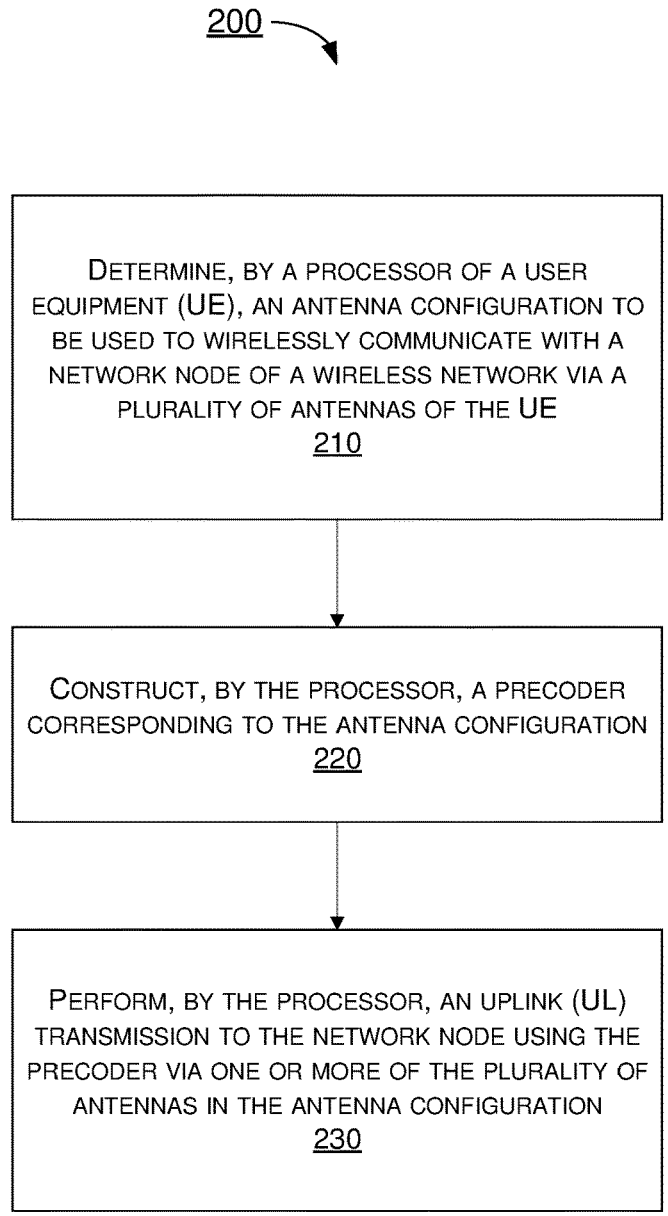
FIG. 2 is a flowchart of an example process in accordance with an implementation of the present disclosure.

FIG. 2 illustrates an example process 200 in accordance with an implementation of the present disclosure. Process 200 may be an example implementation of the various procedures, scenarios, schemes, solutions, concepts and techniques, or a combination thereof, whether partially or completely, with respect to codebook-based uplink transmission in wireless communications in accordance with the present disclosure. Process 200 may represent an aspect of implementation of features of communication apparatus 110. Process 200 may include one or more operations, actions, or functions as illustrated by one or more of blocks 210, 220 and 230. Although illustrated as discrete blocks, various blocks of process 200 may be divided into additional blocks, combined into fewer blocks, or eliminated, depending on the desired implementation. Moreover, the blocks of process 200 may executed in the order shown in FIG. 2 or, alternatively, in a different order, and one or more of the blocks of process 200 may be repeated one or more times. Process 200 may be implemented by communication apparatus 110 or any suitable UE or machine type devices. Solely for illustrative purposes and without limitation, process 200 is described below in the context of communication apparatus 110 as a UE and network apparatus 120 as a network node (e.g., gNB) of a wireless network. Process 200 may begin at block 210.

At 210, process 200 may involve processor 112 of communication apparatus 110 determining an antenna configuration (e.g., ULA or non-ULA antenna configuration) to be used to wirelessly communicate with network apparatus 120 via the plurality of antennas 118 of transceiver 116. Process 200 may proceed from 210 to 220.

At 220, process 200 may involve processor 112 constructing a precoder or codebook corresponding to the antenna configuration. Process 200 may proceed from 220 to 230.

At 230, process 200 may involve processor 112 performing, via transceiver 116, an UL transmission to network apparatus 120 using the precoder via one or more of the plurality of antennas 118 in the antenna configuration.

In some implementations, in constructing the precoder, process 200 may involve processor 112 performing the following: (a) applying a phase rotation to a first vector in a mutually unbiased basis (MUB) of a plurality of MUBs to generate a second vector; (b) applying a Householder transformation on the second vector to generate an orthonormal basis; and (c) performing column selection on the orthonormal basis to obtain the precoder.

In some implementations, the phase rotation may include a zero-degree rotation for all elements in the first vector.

In some implementations, in performing the column selection, process 200 may involve processor 112 selecting one of a plurality of columns in the orthonormal basis for the precoder having a chordal distance smaller than a predefined value with other constructed or chosen precoders. In some implementations, the chordal distance comprises a distance between the precoder and each of one or more other precoders from one or more other MUBs of the plurality of MUBs in a respective phase rotation.

In some implementations, the precoder may include one or more port selection precoders. In some implementations, the plurality of MUBs may include the following:

$$M_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}$$

In some implementations, in constructing the precoder, process 200 may involve processor 112 performing a precoder construction procedure that includes: (a) constructing a dual-stage codebook with discrete Fourier transformation (DFT) beams; (b) selecting a vector or matrix from the dual-stage codebook; (c) applying a Householder transformation on the vector or matrix to generate an orthonormal basis; and (d) performing column selection on the orthonormal basis to obtain the precoder.

In some implementations, the vector or matrix selected from the dual-stage codebook may include a rank 1 precoder.

In some implementations, in applying the Householder transform, process 200 may involve processor 112 negating a sign of a first element in the rank 1 precoder while retaining a sign of each of other elements in the rank 1 precoder.

In some implementations, the precoder may be a rank 2, rank 3 or rank 4 precoder. In some implementations, in performing the UL transmission to the network node using the precoder, process 200 may involve processor 112 performing either: (a) performing the UL transmission to the network node using the rank 2, rank 3 or rank 4 precoder constructed with the Householder transform and column selection solely; or (b) performing the UL transmission to the network node using the rank 2, rank 3 or rank 4 precoder constructed from the precoder construction procedure described above or a pre-existing rank 2, rank 3 or rank 4 precoder.

Figure 3:
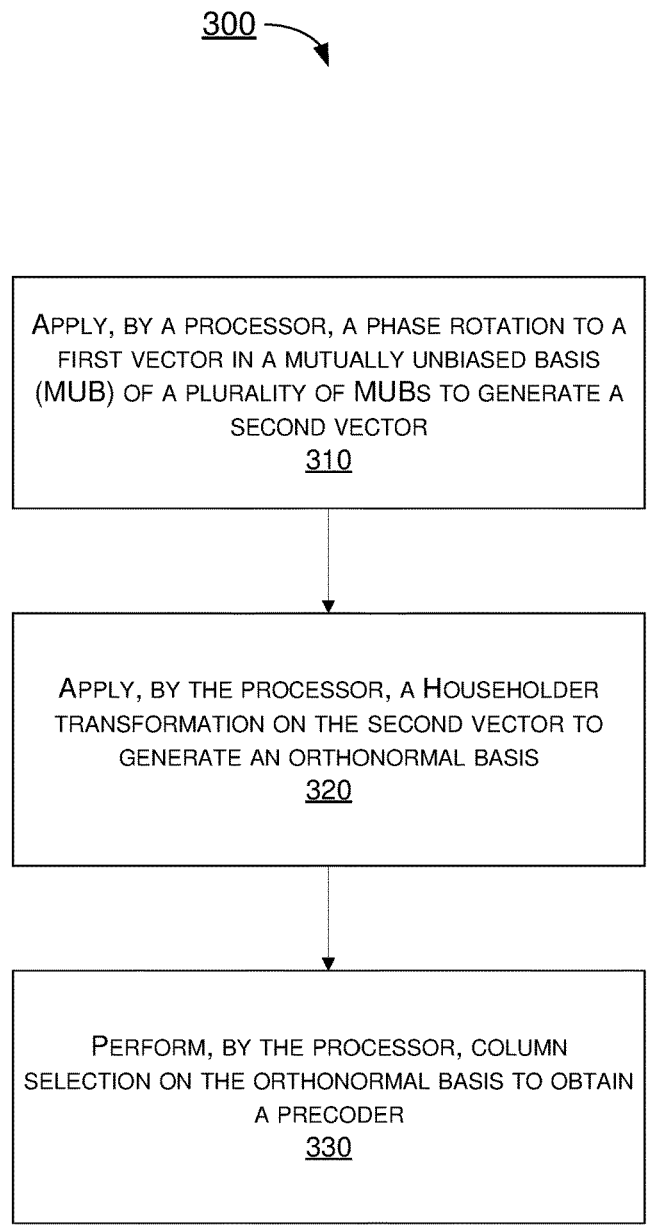
FIG. 3 is a flowchart of an example process in accordance with an implementation of the present disclosure.

FIG. 3 illustrates an example process 300 in accordance with an implementation of the present disclosure. Process 300 may be an example implementation of the various procedures, scenarios, schemes, solutions, concepts and techniques, or a combination thereof, whether partially or completely, with respect to construction of a precoder or codebook in accordance with the present disclosure. Process 300 may represent an aspect of implementation of features of communication apparatus 110. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation.

Moreover, the blocks of process 300 may executed in the order shown in FIG. 3 or, alternatively, in a different order, and one or more of the blocks of process 300 may be repeated one or more times. Process 300 may be implemented by communication apparatus 110 or any suitable UE or machine type devices. Solely for illustrative purposes and without limitation, process 300 is described below in the context of communication apparatus 110 as a UE and network apparatus 120 as a network node (e.g., gNB) of a wireless network. Process 300 may begin at block 310.

At 310, process 300 may involve processor 112 of communication apparatus 110 applying a phase rotation to a first vector in a mutually unbiased basis (MUB) of a plurality of MUBs to generate a second vector. Process 300 may proceed from 310 to 320.

At 320, process 300 may involve processor 112 applying a Householder transformation on the second vector to generate an orthonormal basis. Process 300 may proceed from 320 to 330.

At 330, process 300 may involve processor 112 performing column selection on the orthonormal basis to obtain a precoder.

In some implementations, the phase rotation may include a zero-degree rotation for all elements in the first vector.

In some implementations, in performing the column selection, process 300 may involve processor 112 selecting one of a plurality of columns in the orthonormal basis for the precoder having a chordal distance smaller than a predefined value with other constructed or chosen precoders. In some implementations, the considered chordal distance may be a distance between the precoder and each of one or more other precoders from one or more other MUBs of the plurality of MUBs in a respective phase rotation.

Figure 4:
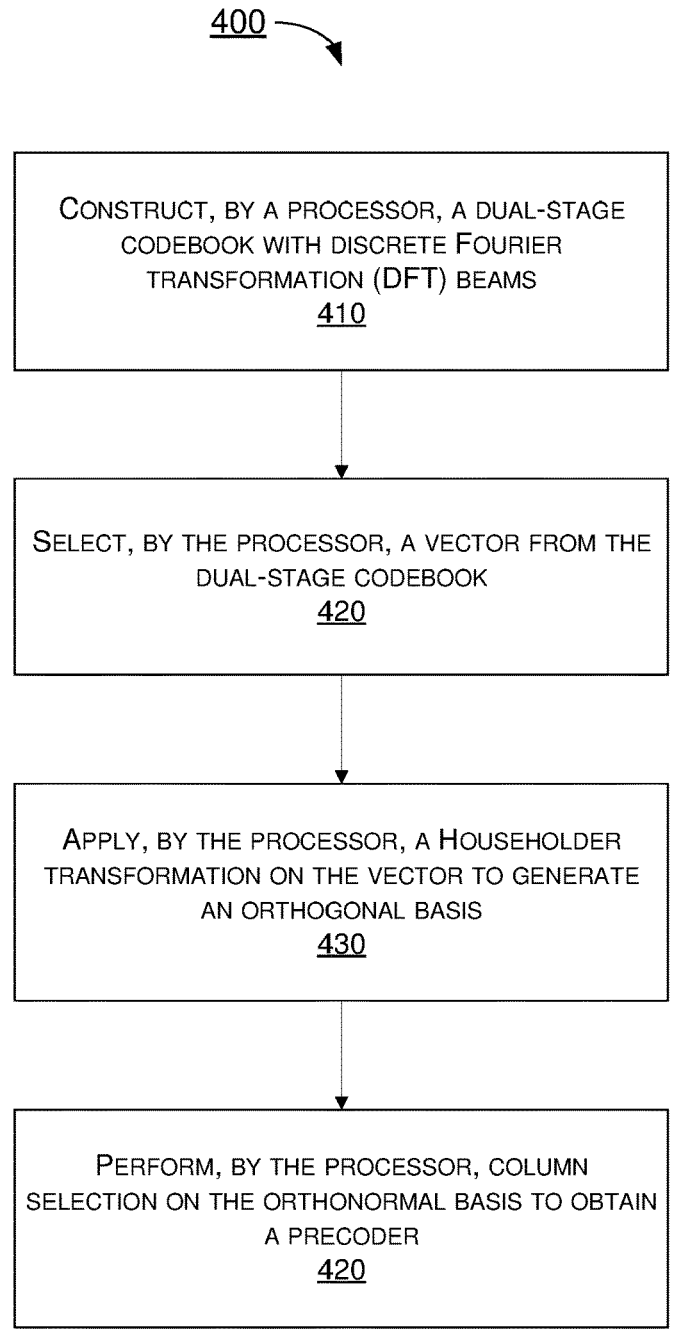
FIG. 4 is a flowchart of an example process in accordance with an implementation of the present disclosure.

FIG. 4 illustrates an example process 400 in accordance with an implementation of the present disclosure. Process 400 may be an example implementation of the various procedures, scenarios, schemes, solutions, concepts and techniques, or a combination thereof, whether partially or completely, with respect to construction of a precoder or codebook in accordance with the present disclosure. Process 400 may represent an aspect of implementation of features of communication apparatus 110. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order, and one or more of the blocks of process 400 may be repeated one or more times. Process 400 may be implemented by communication apparatus 110 or any suitable UE or machine type devices. Solely for illustrative purposes and without limitation, process 400 is described below in the context of communication apparatus 110 as a UE and network apparatus 120 as a network node (e.g., gNB) of a wireless network. Process 400 may begin at block 410.

At 410, process 400 may involve processor 112 of communication apparatus 110 constructing a dual-stage codebook with discrete Fourier transformation (DFT) beams. Process 400 may proceed from 410 to 420.

At 420, process 400 may involve processor 112 selecting a vector from the dual-stage codebook. Process 400 may proceed from 420 to 430.

At 430, process 400 may involve processor 112 applying a Householder transformation on the vector to generate an orthonormal basis. Process 400 may proceed from 430 to 440.

At 440, process 400 may involve processor 112 performing column selection on the orthonormal basis to obtain a precoder.

In some implementations, the vector selected from the dual-stage codebook may include a rank 1 precoder.

In some implementations, in performing the Householder transform, process 400 may involve processor 112 negating a sign of a first element in the rank 1 precoder while retaining a sign of each of other elements in the rank 1 precoder.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   constructing, by a processor of a user equipment (UE), a precoder to be used to wirelessly communicate with a network node of a wireless network; and
   performing, by the processor, an uplink (UL) transmission to the network node using the precoder via one or more of a plurality of antennas of the UE,
   wherein the constructing of the precoder comprises performing either a first procedure or a second procedure,
   wherein the first procedure comprises:
      applying a phase rotation to a first vector in a mutually unbiased basis (MUB) of a plurality of MUBs to generate a second vector;
      applying a first Householder transformation on the second vector to generate a first orthonormal basis; and
      performing column selection on the first orthonormal basis to obtain the precoder, and
   wherein the second procedure comprises:
      constructing a dual-stage codebook with discrete Fourier transformation (DFT) beams;
      selecting a vector or matrix from the dual-stage codebook;
      applying a second Householder transformation on the vector or matrix to generate a second orthonormal basis; and
      performing column selection on the second orthonormal basis to obtain the precoder.

2. The method of claim 1, wherein the phase rotation comprises a zero-degree rotation for all elements in the first vector.

3. The method of claim 1, wherein the column selection comprises selecting one of a plurality of columns in the first orthonormal basis for the precoder having a chordal distance smaller than a predefined value with other chosen precoders, and wherein the chordal distance comprises a distance between the precoder and each of one or more other precoders from one or more other MUBs of the plurality of MUBs in a respective phase rotation.

4. The method of claim 1, wherein, in constructing the precoder using the first procedure, the precoder comprises one or more port selection precoders, and wherein the plurality of MUBs comprise:

$$M_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}.$$

5. The method of claim 1, wherein, in constructing the precoder using the second procedure, the vector or matrix selected from the dual-stage codebook comprises a rank 1 precoder.

6. The method of claim 5, wherein the applying of the second Householder transformation comprises negating a sign of a first element in the rank 1 precoder while retaining a sign of each of other elements in the rank 1 precoder.

7. The method of claim 5, wherein the precoder comprises a rank 2, rank 3 or rank 4 precoder.

8. The method of claim 7, wherein the performing of the UL transmission to the network node using the precoder comprises either:
   performing the UL transmission to the network node using the rank 2, rank 3 or rank 4 precoder constructed from the second Householder transformation solely; or
   performing the UL transmission to the network node using the rank 2, rank 3 or rank 4 precoder constructed from the precoder construction procedure or a pre-existing rank 2, rank 3 or rank 4 precoder.

9. An apparatus, comprising:
   a transceiver comprising a plurality of antennas, the transceiver capable of wirelessly communicating with a network node of a wireless network; and
   a processor coupled to the transceiver, the processor capable of:
      constructing a precoder to be used to wirelessly communication with the network node; and
      performing, via the transceiver, an uplink (UL) transmission to the network node using the precoder via one or more of the plurality of antennas,
   wherein, in constructing the precoder, the processor performs either a first procedure or a second procedure, wherein, in performing the first procedure, the processor performs operations comprising:
- applying a phase rotation to a first vector in a mutually unbiased basis (MUB) of a plurality of MUBs to generate a second vector;
- applying a first Householder transformation on the second vector to generate a first orthonormal basis; and
- performing column selection on the first orthonormal basis to obtain the precoder, and wherein, in performing the second procedure, the processor performs operations comprising:
- constructing a dual-stage codebook with discrete Fourier transformation (DFT) beams;
- selecting a vector or matrix from the dual-stage codebook;
- applying a second Householder transformation on the vector or matrix to generate a second orthonormal basis; and
- performing column selection on the second orthonormal basis to obtain the precoder.

10. The apparatus of claim 9, wherein the phase rotation comprises a zero-degree rotation for all elements in the first vector.

11. The apparatus of claim 9, wherein in performing the column selection the processor is capable of selecting one of a plurality of columns in the first orthonormal basis for the precoder having a chordal distance smaller than a predefined value with other chosen precoders, and wherein the chordal distance comprises a distance between the precoder and each of one or more other precoders from one or more other MUBs of the plurality of MUBs in a respective phase rotation.

12. The apparatus of claim 9, wherein, in constructing the precoder using the first procedure, the precoder comprises one or more port selection precoders, and wherein the plurality of MUBs comprise:

$$M_0 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}.$$

13. The apparatus of claim 9, wherein, in constructing the precoder using the second procedure, the vector or matrix selected from the dual-stage codebook comprises a rank 1 precoder.

14. The apparatus of claim 13, wherein in applying the second Householder transformation the processor is capable of negating a sign of a first element in the rank 1 precoder while retaining a sign of each of other elements in the rank 1 precoder.

15. The apparatus of claim 13, wherein the precoder comprises a rank 2, rank 3 or rank 4 precoder.

16. The apparatus of claim 15, wherein in performing the UL transmission to the network node using the precoder the processor is capable of either:
- performing the UL transmission to the network node using the rank 2, rank 3 or rank 4 precoder constructed from the second Householder transformation solely; or
- performing the UL transmission to the network node using the rank 2, rank 3 or rank 4 precoder constructed from the precoder construction procedure or a pre-existing rank 2, rank 3 or rank 4 precoder.

* * * * *